United States Patent Office 3,279,909
Patented Oct. 18, 1966

3,279,909
METHOD FOR COMBATTING WEEDS
Jasper Daams and Harmannus Koopman, Weesp, Netherlands, assignors to North American Philips Company Inc., New York, N.Y., a corporation of Delaware
No Drawing. Original application June 19, 1962, Ser. No. 203,489. Divided and this application Dec. 9, 1963, Ser. No. 336,087
6 Claims. (Cl. 71—2.5)

This application is a division of our copending application 203,489, filed June 19, 1962, now abandoned.

This invention relates to herbicides suitable more particularly for inhibiting the germination of seeds of weeds and also intended for inhibiting the growth of plants.

It relates to a herbicidal composition comprising as an active ingredient a compound according to the formula:

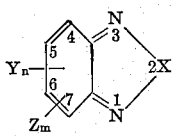

in which X represents sulphur or selenium and preferably sulphur, Y represents halogen and preferably chlorine, Z represents an alkyl radical having 1 to 6 carbon atoms, preferably a methyl radical and $n=0$ to 3 and $m=0$ to 3, and $n+m$ is at least equal to 1.

The activity of the compounds was determined inter alia with respect to chick weed, pigweed, blue grass, spurry, wild oats and millet.

The dichloro compounds 4,6-dichlorobenzthiadiazole-2,1,3 and 4,7-dichlorobenzthiadiazole-2,1,3 have a strong herbicidal activity; 4-methyl-benzthiadiazole-2,1,3 and 5-methyl-4,7 - dichlorobenzthiadiazole - 2,1,3 have a good herbicidal activity.

The trichloro compound 4,5,7-trichlorobenzthiadiazole-2,1,3 has a very strong herbicidal activity and is distinguished especially by a strong inhibiting activity on the germination of seeds and a growth-inhibiting activity in plants when administered to the roots.

4-methyl-5,7 - dichlorobenzthiadiazole - 2,1,3 showed a particularly good pre-emergency action, as appeared inter alia from tests with the said weeds.

Means according to the invention may especially be used with advantage in the so-called pre-emergency treatment. This treatment is carried out before the seeds or seed-potatoes emerge and has for its object to inhibit the germination of weed seeds present in the upper layer of the soil, thus neutralising the same.

Known pre-emergency means in many cases cannot be used for combating weed in cruciferous plants such as kinds of cabbage, since they cause too much injury to these plants. Such is not the case with the means under consideration which can therefore advantageously be used for such a treatment.

Compounds according to the invention are, in addition to those referred to, inter alia 4-chlorobenzthiadiazole-2,1,3; 4.6-dichloro-5-methyl-benzthiadiazole-2,1,3; 4,7-dichloro-5-ethyl-benzthiadiazole - 2,1,3; 4,5,7 - trichloro - 6-methyl-benzthiadiazole-2,1,3 and the corresponding benzselenodiazoles, for example 4-chloro-benzselenodiazole-2, 1,3 and 4,5,7 - trichlorobenzselenodiazole - 2,1,3 and 4-methyl-5,7-dichlorobenzselenodiazole-2,1,3.

Most compounds according to the above-mentioned formula, in which X represents sulphur, are described in literature, as well as their methods of preparation.

4,5,7-trichlorobenzthiadiazole-2,1,3 and 4-methyl-5,7-dichlorobenzthiadiazole-2,1,3, the most active ones of the present compounds, are new substances. They may be manufactured by methods known for the manufacture of such a compound or similar methods, for example, by reaction of 3,4,6-trichloro- or 3-methyl - 4,6 - dichlorophenylenediamine-1,2 with thionylaniline or with thionylchloride, or by loading sulphur dioxide into 3,4,6-trichloro- or 3-methyl-4,6-dichloro-phenylenediamine-1,2 at elevated temperature, or by heating 3,4,6-trichloro- or 3-methyl-4,6-dichloro-phenylenediamine-1,2 with an aqueous solution of sulphur dioxide or sodium hydrosulphite, or by replacing the amino group in 5,7-dichloro-4-aminobenzthiadiazole-2,1,3 by chlorine by means of a Sandmeyer reaction, or by addition of 2 mols of chlorine to either 4- or 5-chlorobenzthiadiazole-2,1,3 or 4-methylbenzthiadiazole-2,1,3 and splitting off 2 mols of HCl from the resulting pentachloro-tetrahydrobenzthiadiazole-2,1,3.

Example 1

220 gs. of 3,4,6-trichlorophenylenediamine-1,2 were dissolved in 1 litre of ether and saturated with dry HCl-gas. Then the ether was removed by evaporation and the residue mixed with 600 ccs. of dry ethanol. After adding 306 gs. of thionylaniline there was boiled for 3 hours. The reaction mixture was then poured into 2 litres of water and extracted with the aid of ether. The resulting extracts were washed with water until neutral reaction was obtained, then dried over sodium sulphate and evaporated to dryness.

Yield: almost quantitative. After crystallisation from isopropanol substantially pure 4,5,7-trichlorobenzthiadiazole with a melting point from 128° to 130° C. was obtained.

Instead of using ethanol, other solvents may be used, for example methanol, benzene, toluene or kerosine ether.

Example 2

A mixture consisting of 21 gs. of the hydrochloric acid salt of 3,4,6-trichlorophenylenediamine-1,2 and 55 ccs. of thionylchloride was boiled with reflux for 3 hours. After dissolving the reaction mixture in 250 ccs. of benzene and adding 250 ccs. of ether to the resulting solution, gas of hydrochloric acid was introduced till saturation was obtained. The resulting deposit was filtered off, the filtrate washed until neutral reaction was obtained, the solution then obtained was dried over sodium sulfate, filtered and the solvent distilled off. The yield of 4,5,7-trichlorobenzthiadiazole-2,1,3 was 16.3 gs. (92%). Melting point 130° C.

3,4,6-trichlorophenylenediamine-1,2 was obtained by reduction of 2-nitro-3,4,6-trichloroaniline.

4 - methylbenzthiadiazole - 2,1,3 was manufactured by reaction of thionylaniline with the hydrochloric acid salt of 3-methylphenylenediamine-1,2 at 135° C. After completion of the reaction, thionylaniline was decomposed by the addition of water and the resulting 4-methylbenzthiadiazole-2,1,3 isolated by extraction with ether and subsequent distillation.

4-methyl - 5,7 - dichlorobenzthiadiazole - 2,1,3 (melting point from 110° to 112° C.) was obtained by loading gaseous chlorine into the resulting distillate after 1% by weight of ferric chloride had been added.

A herbicidal composition according to the invention may be manufactured by methods known for the production of such means. To this end, it is possible, for example, for an active substance to be mixed with a pulverulent inert carrier such as chalk, dolomite, kaoline, pipe-clay, attapulgite, or dissolved or dispersed in an inert solvent, such as toluene, xylene, aliphatic, alicyclic or aromatic ketones, for example acetone, methylethyl ketone or cyclohexanone, or in mixtures thereof with hydrocarbons, if desired while adding surface-active substances and dispersion agents. They may also be mixed with artificial manures.

A dust may be manufactured, for example, by mixing 5 parts by weight of an active substance with 95 parts by weight of infusorial earth and then grinding the mixture.

A wettable powder may be obtained, for example, by intimately mixing 20 parts by weight of an active substance with 5 parts by weight of olcylamidomethyltaurate, 10 parts by weight of calciumlignino sulphonate and 65 parts by weight of chalk and then grinding the resulting mixture.

Miscible oils containing from 5% to 30% and preferably from 10% to 20% of active constituent and from 5% to 10% of ionogenous or non-ionogenous emulsifying agent or mixtures thereof may be manufactured by dissolving these constituents in organic solvents and, for example, aliphatic or aromatic ketones such as acetone and cyclohexanone, mixed if desired with aromatic hydrocarbons such as toluene and xylene.

A dispersion may be manufactured, for example, by pouring into water a miscible oil obtained, for example, by mixing 25 parts by weight of active substance, 10 parts by weight of polyoxyethylenesorbitan fatty-acid ester, 25 parts by weight of acetone and 30 parts by weight of methylethyl ketone.

What is claimed is:

1. A method of combatting weeds comprising contacting said weeds with a herbicidal amount of a heterocyclic compound of the formula:

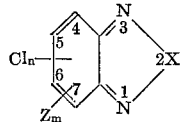

wherein X is a divalent atom having an atomic weight between 32 and 79 and belonging to group VIA of the periodic table, Z is alkyl of 1 to 6 carbon atoms, $n$ is a whole number of 0 to 3, $m$ is a whole number of 0 to 3 and the sum of $n+m$ is at least equal to 1.

2. The method of claim 1 wherein X is sulfur.
3. The method of claim 2 wherein Z is methyl.
4. The method of claim 3 wherein $n$ is a whole number from 2 to 3, $m$ is a whole number from 0 to 1 and at least one of the carbon atoms 5 and 6 in the heterocyclic compound is free of any chlorine substituent.
5. A method of combatting weeds comprising treating said weeds with a herbicidally effective amount of 4,5,7-trichlorobenzthiadiazole-2,1,3.
6. A method of combatting weeds comprising treating said weeds with a herbicidally effective amount of 4-methyl-5,7-dichlorobenzthiadiazole-2,1,3.

References Cited by the Examiner

UNITED STATES PATENTS

| | | | |
|---|---|---|---|
| 2,326,471 | 8/1943 | Lontz | 71—2.6 |
| 2,983,730 | 5/1961 | Cragoe | 260—304 |

OTHER REFERENCES

Heterocyclic Compounds, by Eldredge, volume 7, pages 581 to 587, 1961.

Khaletskii, Chemical Abstracts, volume 51, pages 14, 696–7, 1957.

The Chemistry of Heterocyclic Compounds, by Bambas, pages 205 to 209, 1952.

LEWIS GOTTS, *Primary Examiner.*

JAMES O. THOMAS, *Examiner.*

A. J. ADAMCIK, *Assistant Examiner.*